Jan. 5, 1943.                F. BOEYE                2,307,192
                              BELT
                      Filed May 22, 1942
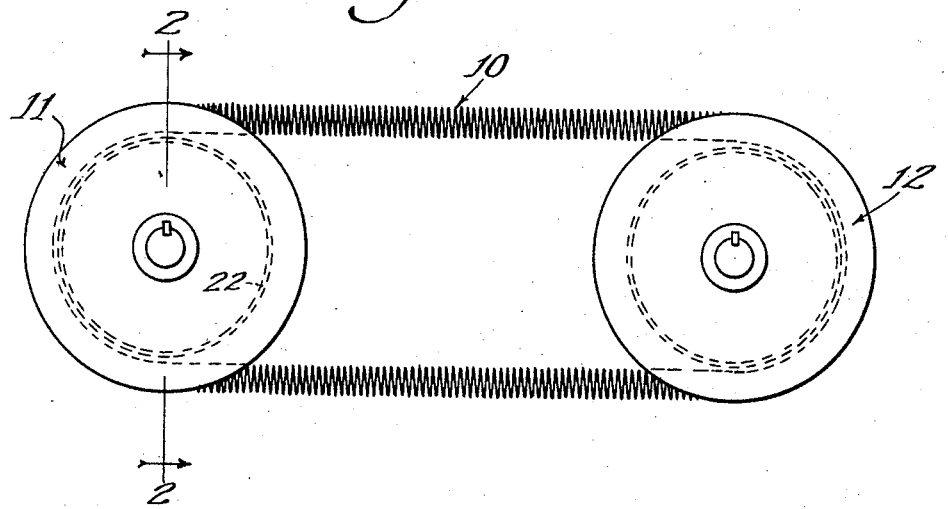
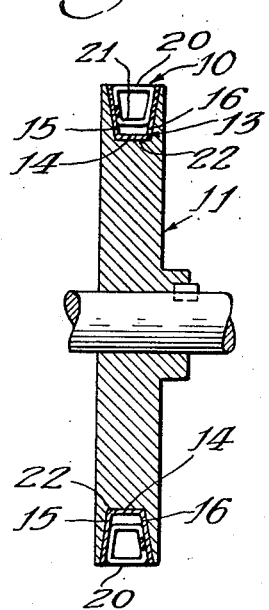
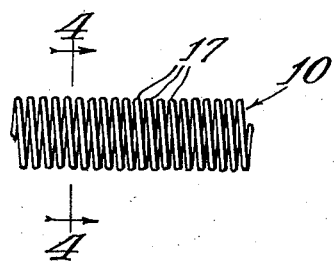
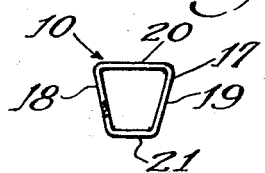
Inventor:
Fred Boeye,
By: Wallace & Cannon
            Attorneys Patented Jan. 5, 1943

2,307,192

UNITED STATES PATENT OFFICE 2,307,192

BELT

Fred Boeye, Wheeling, Ill.

Application May 22, 1942, Serial No. 444,049

1 Claim. (Cl. 74—238)

This invention relates to V-belts, and more particularly to continuous belts comprising a series of coils or convolutions having a trapezoidal cross section.

V-belts are most generally used on moderately light work such, for example, as driving light machines or driving devices such as the fan or the generator of an automobile. Heretofore, most of the so-called V-belts have been made from leather or rubber and the like. However, such belts have several undesirable features such as, for example, a relatively small tensile strength per unit of cross sectional area so that for heavier loads a relatively large belt is required; and a relatively great density so that belts made from these materials are relatively heavy. It is an object of my invention to provide a belt which can be constructed in a practical manner from materials, such as steel, which have relatively high tensile strength per unit of cross sectional area so that belts may be provided which have a strength equal to or greater than the strength of the belts now in use and which are lighter in weight and of relatively small cross section.

It is also a known fact that rubber and leather belts and the like, dry out and deteriorate when subjected to higher temperatures such, for example, as when used alongside the cylinder walls of internal combustion engines, and it is another object of my invention to provide a belt which is not affected by ordinary operating temperatures.

A further object of my invention is to provide a belt which can safely be operated at relatively high velocities, and because of the lightness of my belt and its relatively great tensile strength per unit of area, this object is realized with my invention.

Where "V-shaped" notches are used in sheaves or pulleys, belts of other shapes may, of course, be used. However, when other shapes are used good broad control between the belt and the pulley is not provided and results in a loss of efficiency in the pulley system. It is an object of my invention to provide a V-belt which may be constructed of continuous convolutions or turns of steel or the like and in which each of the convolutions or turns are of substantially a trapezoidal shape to correspond substantially to the shape of the groove of the pulley so that broad contact is provided between the pulley and the belt.

In addition, when belts are used which have a different shape than that of the groove in which they are used, such, for example, as when ropes or cables having a circular cross section are used in a V-pulley, the belts are continually being squeezed or crushed and then released as they pass over the pulley and pass beyond it, respectively. This continual crushing and releasing of belts having, for example, a circular cross section, results in an undesirable lateral flexing of the material from which the belt is constructed, which continual flexing, after a period of time, tends to cause a weakening in the belt and subjects it to premature breakage. Therefore, it is another object of my invention to provide a belt having shape and construction which effectively resists the squeezing and crushing action of the V-pulley on which it is to be used and therefore undesired lateral flexing of the material from which the belt is constructed is held to a minimum.

Another object of my invention is to provide a belt the shape of which corresponds relatively closely to the shape of the V-notch with which it is used and which is so constructed that the upper and lower portions resist the crushing action inherent to use with the V-pulleys.

Other and further objects of the present invention will be apparent from the following description and the claim, and are illustrated in the accompanying drawing which, by way of illustration, shows the preferred embodiment of the present invention and principles thereof and what I now consider to be the best modes in which I have contemplated applying those principles. Other embodiments of the invention embodying the same or equivalent principles may be used by those skilled in the art without departing from the present invention and the purview of the appended claim.

In the drawing,

Fig. 1 is an elevational view showing my device mounted on two V-pulleys;

Fig. 2 is a sectional view taken substantially on the line 2—2 of Fig. 1;

Fig. 3 is a detail view of a device constructed in accordance with my invention; and Fig. 4 is a sectional view taken substantially on the line 4—4 of Fig. 3.

In the accompanying drawing a belt 10 is shown mounted on V-pulleys 11 and 12 (Fig. 1).

V-pulleys, such as those shown in the accompanying drawings have grooves 13 which, though commonly termed "V-shaped" grooves, are in reality of a substantially trapezoidal cross section, having a bottom wall 14 and two side walls 15 and 16.

The belt 10 is constructed of a strand of material (preferably iron or steel) which is wound into a series of convolutions 17 which have a trapezoidal shape corresponding substantially to the shape of the groove 13 in the pulleys. The convolutions 17 of the belt 10 have side walls 18 and 19, top wall 20, and a bottom wall 21. And, as best shown in Fig. 2, when the belt 10 is properly positioned within the grooves of a V-pulley such as pulley 11, the side members 18 and 19 of the belt 10 engage the side walls 15 and 16 of the groove 13 and hold the bottom member 20 up and out of contact with the lower wall 14 of the groove 13. When so positioned in the groove 13, the tension on the belt 10 causes it to seat firmly therein so that the good driving contact between the members 18 and 19 of the belt 10 and the side walls 15 and 16 of the groove 13 is maintained. Also, when properly positioned in the groove 13 in this manner, the side walls 15 and 16 of the groove 13 press inwardly on the side members 18 and 19 of the belt 10 and, because the angle between these two members is not great, the pressure is applied substantially parallel to the top and bottom walls 20 and 21, respectively, and so is taken up thereby with a minimum of bending or flexing.

After a V-belt and V-pulley have been used for a substantial length of time, either because of wear on the belt or the groove (or both), the belt settles further into the groove until at last the bottom portion thereof contacts the bottom portion of the groove. It will be noted that when this occurs the belt is prevented from wedging tightly into the groove so that the pressure between the sides of the groove and the sides of the belt is diminished and renders the belt more susceptible to slippage. For this reason, and especially when using a metal belt such as my novel belt 10 which will wear the groove to a greater extent, it is advisable to insert such as inserts 22 in the pulley grooves 13. These inserts 22 may be of leather, canvas or composition material and the like and should be cemented and riveted firmly into the grooves 13. These inserts have the added advantage that they may be chosen with an eye to providing the desired coefficient of friction with the particular belt material used and, therefore, give standard pulleys greater adaptability.

It will be noted that when my novel belt is used in a proper manner such as that set forth heretofore, that it provides a strong and practical belting for power transmission which will give long and efficient service.

Furthermore, it will be noted that the present invention accomplishes its intended objects, some of which have been specifically referred to hereinabove and others of which will be apparent from the foregoing description taken in conjunction with the accompanying drawing.

While I have illustrated and described selected embodiments of my invention, it is to be understood that these are capable of variation and modification and I, therefore, do not wish to be limited to the precise details set forth but desire to avail myself of such changes and alterations as fall within the purview of the following claim.

I claim:

A continuous one-piece belt adapted to drivingly connect a pair of V-shaped grooved pulleys, and comprising a length of wire formed into a series of convolutions each having a substantially trapezoidal cross section, each of said convolutions being defined by substantially straight inner, outer and side portions, said inner and outer portions lying in substantially parallel planes and said outer portion being substantially longer than said inner portion.

FRED BOEYE.